United States Patent [19]
Kaku et al.

[11] Patent Number: 5,694,422
[45] Date of Patent: Dec. 2, 1997

[54] FIXED EQUALIZER AND EQUALIZING METHOD

[75] Inventors: Takashi Kaku; Hideo Miyazawa, both of Kawasaki, Japan

[73] Assignee: Fujitsu Limited, Kawasaki, Japan

[21] Appl. No.: 688,678

[22] Filed: Jul. 29, 1996

Related U.S. Application Data

[63] Continuation of Ser. No. 34,817, Mar. 19, 1993, abandoned.

[30] Foreign Application Priority Data

Mar. 19, 1992 [JP] Japan ................................. 4-062887

[51] Int. Cl.$^6$ ....................................................... H04B 3/14
[52] U.S. Cl. ........................ 375/229; 364/724.2; 333/28 R
[58] Field of Search ................................. 375/229, 230, 375/232, 234, 235, 233, 266, 350, 340, 343; 364/724.2, 724.19, 724.11, 572; 333/28 R, 18, 12, 138

[56] References Cited

U.S. PATENT DOCUMENTS

| | | | |
|---|---|---|---|
| 3,522,546 | 8/1970 | Jackson et al. | 375/232 |
| 3,980,873 | 9/1976 | Mattei | 364/727.12 |
| 4,247,940 | 1/1981 | Mueller et al. | 375/214 |
| 4,483,009 | 11/1984 | Honda et al. | 375/232 |
| 4,491,808 | 1/1985 | Saito | 333/28 R |
| 4,872,184 | 10/1989 | Yamaguchi et al. | 375/232 |

Primary Examiner—Wellington Chin
Assistant Examiner—William Luther
Attorney, Agent, or Firm—Staas & Halsey

[57] ABSTRACT

A fixed equalizer and a fixed equalization method compensates for amplitude distortion, delay distortion, etc., of a signal transmitted over a transmission line. A processor unit carries out filtering process, such as amplitude equalization, delay equalization, line equalization, etc., in accordance with parameters read from a memory. In view of the fact that amplitude equalization process can be achieved by a combination of a highpass filter and a lowpass filter and line equalization process can be achieved by a filter having an attenuating characteristic which is negative at low frequencies and positive at high frequencies, the present invention stores parameters providing a characteristic corresponding to the synthesis of the characteristics of such filters in the memory and performs filtering computation on the basis of the parameters.

7 Claims, 10 Drawing Sheets

| DEQ | CEQ | LEQ 1 | LEQ 2 | SECONDARY IIR 1 | SECONDARY IIR2 | SECONDARY IIR3 |
|---|---|---|---|---|---|---|
| 0 | 0 | 0 | 0 | — | — | — |
| 0 | 0 | 0 | 1 | LEQ | — | — |
| 0 | 0 | 1 | 0 | LEQ | — | — |
| 0 | 0 | 1 | 1 | LEQ | — | — |
| 0 | 1 | 0 | 0 | LPF | HPF | — |
| 0 | 1 | 0 | 1 | LPF | (HPF) | (LEQ) |
| 0 | 1 | 1 | 0 | LPF | (HPF) | (LEQ) |
| 0 | 1 | 1 | 1 | LPF | (HPF) | (LEQ) |
| 1 | 0 | 0 | 0 | DEQ | — | — |
| 1 | 0 | 0 | 1 | LEQ | DEQ | — |
| 1 | 0 | 1 | 0 | LEQ | DEQ | — |
| 1 | 0 | 1 | 1 | LEQ | DEQ | — |
| 1 | 1 | 0 | 0 | LPF | DEQ | HPF |
| 1 | 1 | 0 | 1 | LPF | DEQ | (LEQ) |
| 1 | 1 | 1 | 0 | LPF | DEQ | (LEQ) |
| 1 | 1 | 1 | 1 | LPF | DEQ | (LEQ) |

Fig. 8

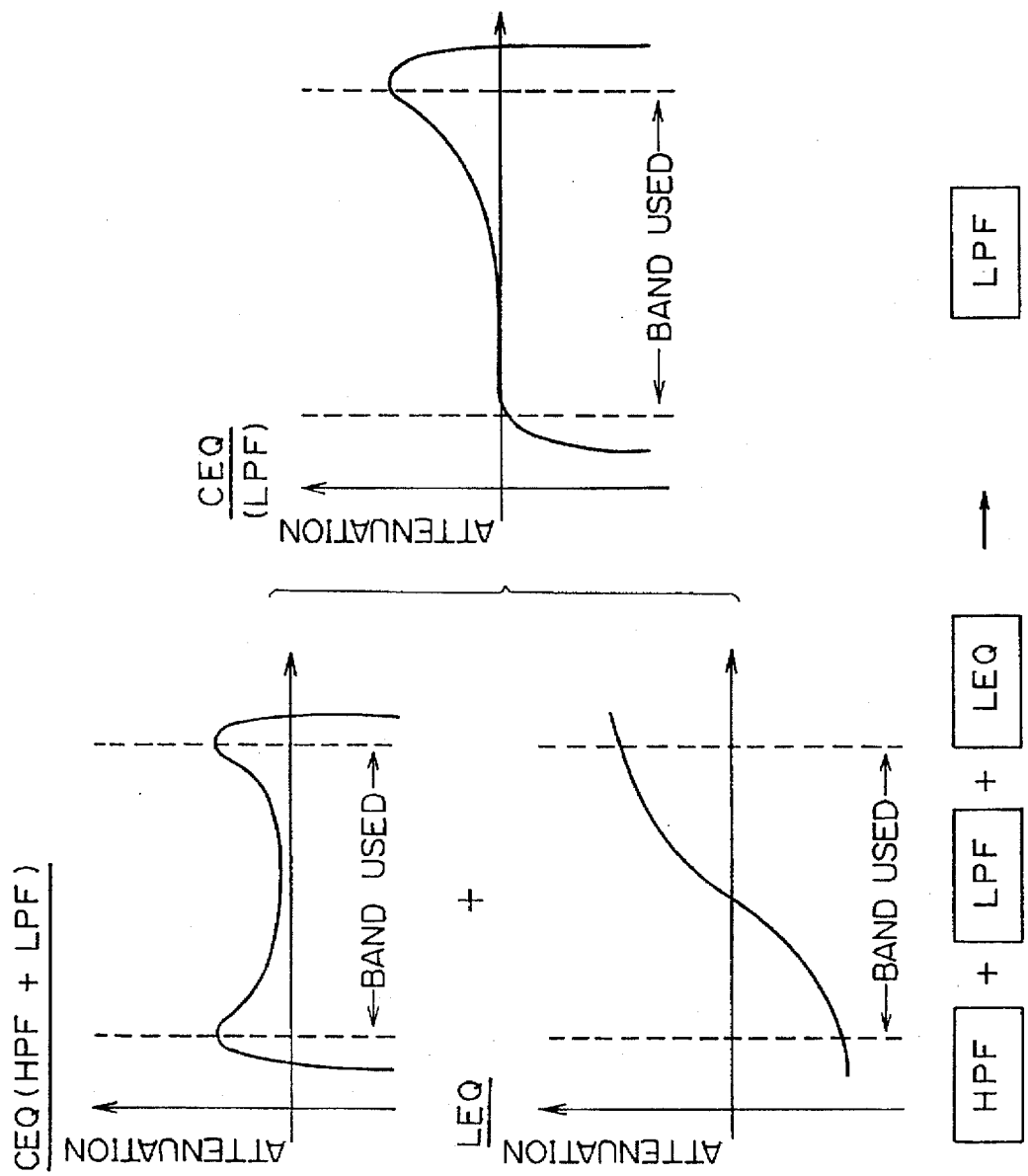

FIXED EQUALIZER AND EQUALIZING METHOD

This application is a continuation of application Ser. No. 08/034,817, filed Mar. 19, 1993, now abandoned.

BACKGROUND OF THE INVENTION

1. Field of the Invention

The present invention relates to a fixed equalizer and an equalizing method of compensating for amplitude distortion and delay distortion of a transmitting signal.

2. Description of the Related Art

In transmitting data among data processor terminals using an analog line, modulator/demodulator devices (modems) are used which modulate original digital transmitting data for transmission over a transmission line and demodulate a signal received over the transmission line to recover the original digital data. The modems are respectively provided with an equalizer which compensates for amplitude distortion, delay distortion, etc., of a signal caused by the transmission line over which the signal is transmitted.

FIG. 1 shows a communication system comprising modems 10 and stations 11 which are connected to subscriber's lines of a public telephone network. In such a communication system, line distortion originates from modem-to-station subscriber's lines, and amplitude distortion and delay distortion originate from the station-to-station line section. For this reason, each of the modems is provided with an equalizer adapted to compensate for these types of distortion.

FIG. 2A is a diagram for use in explanation of the operation of a modem at the time of reception, and FIG. 2B is a diagram for use in explanation of the operation of a modem at the time of transmission.

As shown in FIG. 2A, at the time of reception, a receive signal is band-limited by a bandpass filter 12, converted to a digital signal by an analog-to-digital (A/D) converter 13, and is then subjected to fixed equalization processes, such as line equalization, amplitude equalization, delay equalization, etc., by a processor 14. The equalized receive signal is then output to a demodulator.

At the time of transmission, as shown in FIG. 2B, the processor 14 performs a rolloff filtering process 16 on coded transmit data to limit its signal bandwidth and then performs a modulation process 17 on the band-limited data for conversion to a passband signal. Processor 14 also performs fixed equalization process 15 on the modulated passband signal. The equalized digital data is converted by a digital-to-analog (D/A) converter 18 to an analog signal which is sent on the transmission line.

Heretofore, the fixed equalizer for performing the above-mentioned delay equalization, amplitude equalization and line equalization is provided with a delay equalizer (DEQ) 21, a compromise (amplitude) equalizer (CEQ) 22 and a line equalizer (LEQ) 23 which are connected in cascade as shown in FIG. 3. These equalizers 21, 22 and 23 are controlled by control signals DEQ, CEQ and LEQ, respectively, to thereby achieve their equalization processes.

FIG. 4 shows an example of an infinite impulse response (IIR) filter. With this type of filter, a change in parameters permits the filter to be changed to a highpass, lowpass, bandpass or notch filter. The IIR filter can be used to construct the delay, amplitude or line equalizer described above. In this case, changing parameters permits a single IIR filter to operate as a delay, amplitude or line equalizer. For example, if the parameters of the secondary IIR filter shown in FIG. 4 are set such that C=F=0 and D=1, then the filter will operate as a line equalizer. In the conventional method, therefore, the parameters of IIR filters are changed to perform delay equalization, amplitude equalization and line equalization in sequence.

However, the conventional equalization method suffers from a problem in that since each equalization process is performed by a separate IIR filter, a large amount of computation is required and more than one processor is needed for real-time processing. Further, an increase in the amount of computing results in an increase in computational error, which degrades the equalization performance.

SUMMARY OF THE INVENTION

An object of the present invention is to reduce the amount of computation required for equalization and to prevent the equalization performance from being degraded.

A feature of the present invention resides in a fixed equalizer comprising parameter storage means for storing parameters which specify a characteristic of at least one filter that is equivalent to a plurality of filters having different filtering characteristics and adapted to different equalization processes so that they are read by information specifying said equalization processes, and computing means for carrying out filtering computation on the basis of parameters read from said parameter storage means in response to information specifying an equalization process to be executed.

According to the present invention, by carrying out filtering computation on the basis of parameters which determine the characteristic of a filter equivalent in its filtering characteristic to a plurality of filters adapted for plural equalization processes (such as amplitude equalization, line equalization, etc.), the present invention can simplify filtering computation which has been performed for each equalization in the conventional method, thus reducing the amount of computation required for equalization considerably.

BRIEF DESCRIPTION OF THE DRAWINGS

One skilled in the art can easily understand additional features and objects of this invention from the description and the preferred embodiments and some of the attached drawings. In the drawings:

FIG. 8 shows the contents of the parameter ROM of FIG. 7;

FIG. 10 is a diagram for use in explanation of filtering characteristics.

DETAILED DESCRIPTION OF THE PREFERRED EMBODIMENTS

Figure 1:
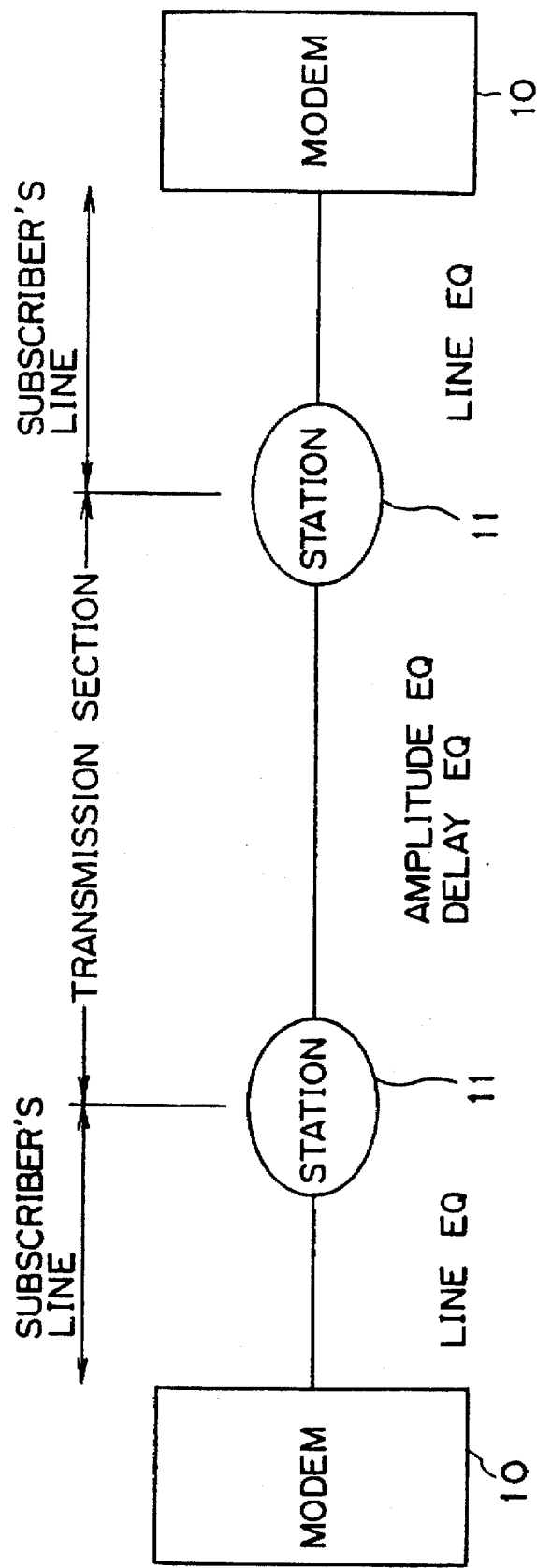
FIG. 1 shows a communication system in which modems and stations are connected to a public telephone network.
Figure 2A:
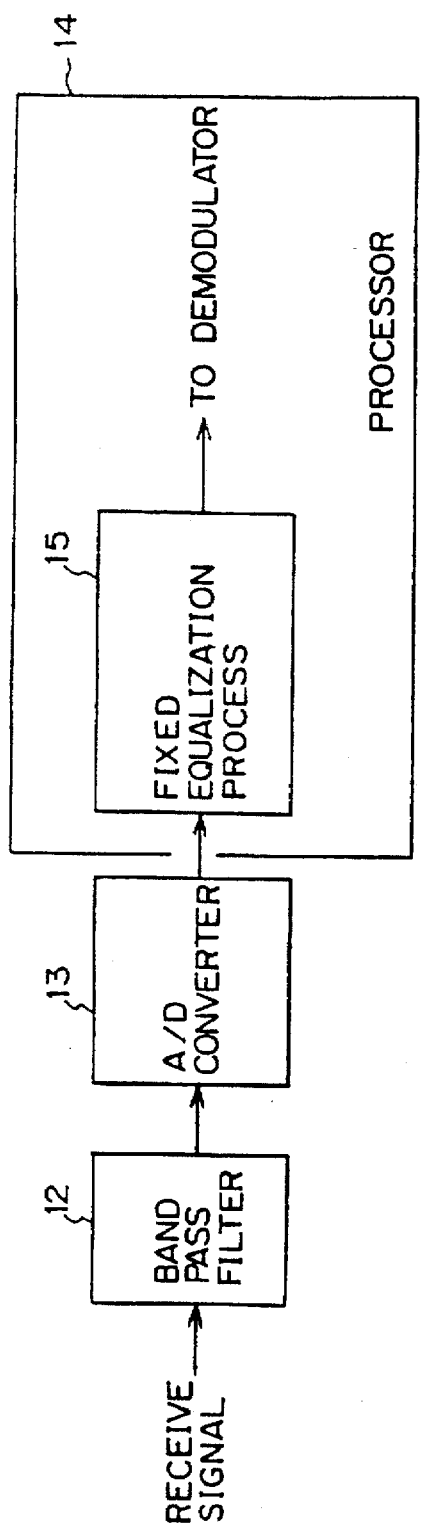
FIG. 2A is a diagram for use in explanation of the equalization operation at the time of reception.
Figure 2B:
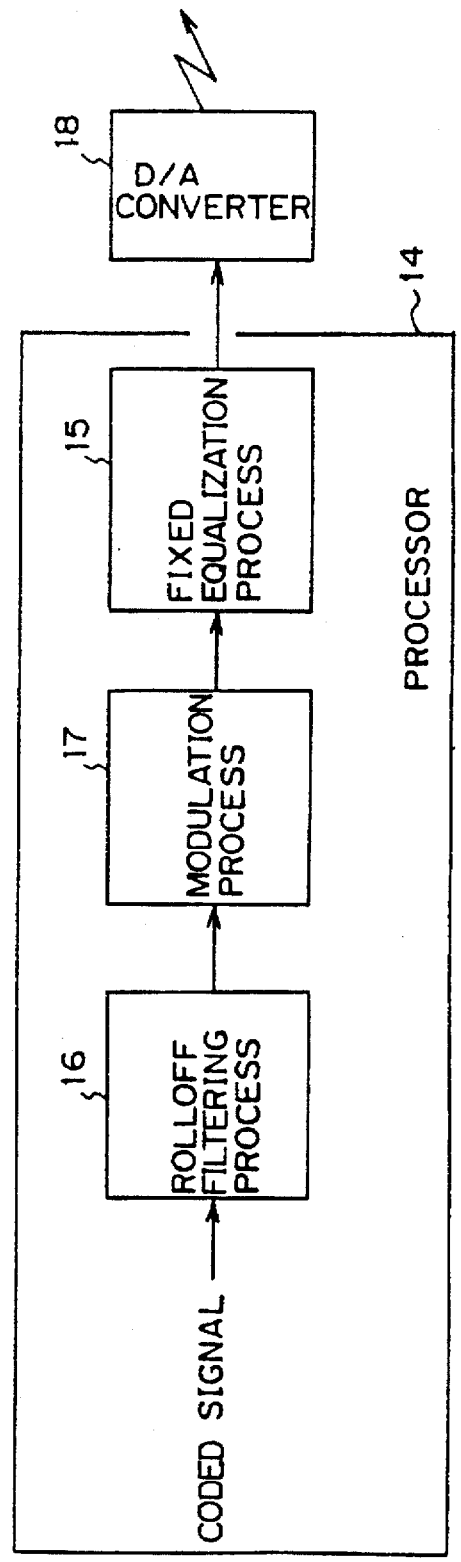
FIG. 2B is a diagram for use in explanation of the equalization operation at the time of transmission.
Figure 3:
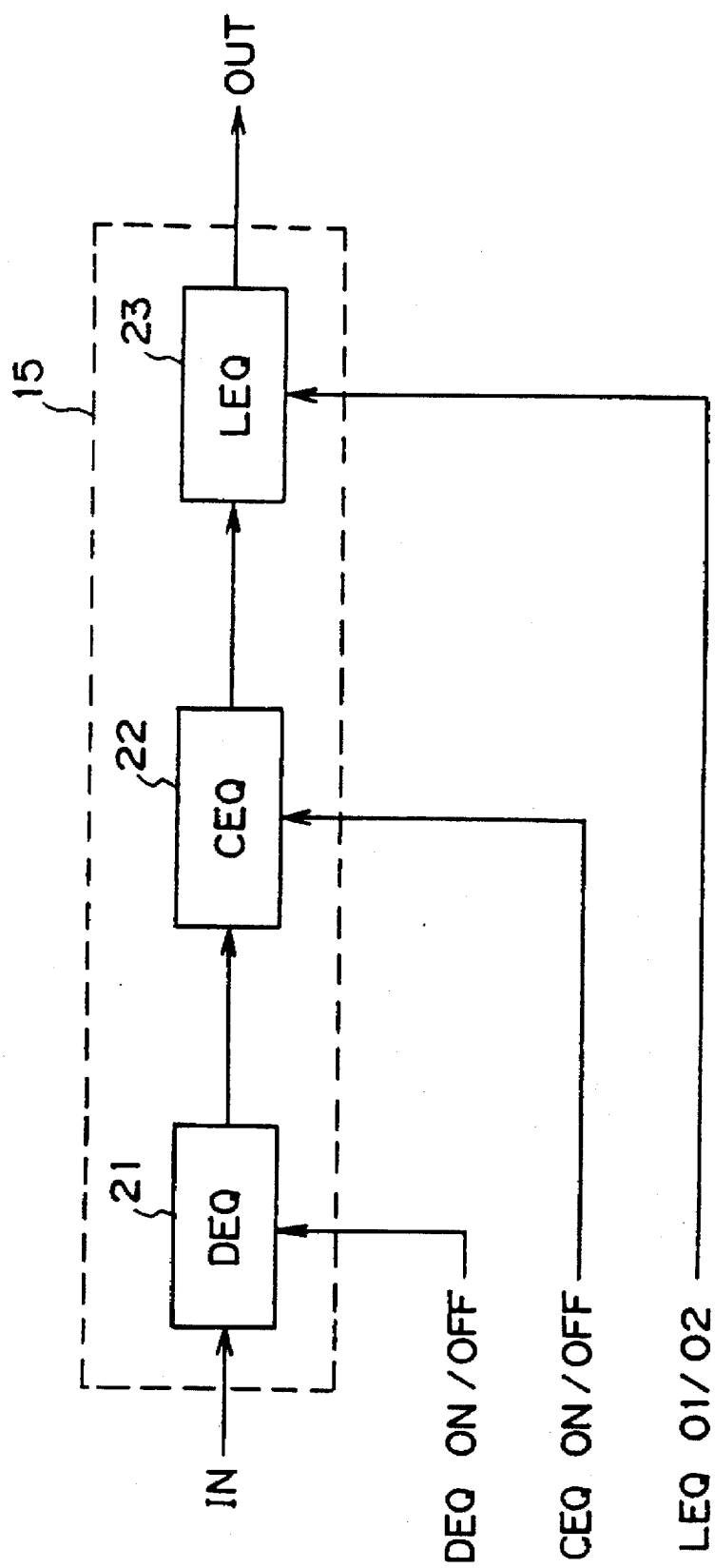
FIG. 3 shows a conventional equalizer.
Figure 4:
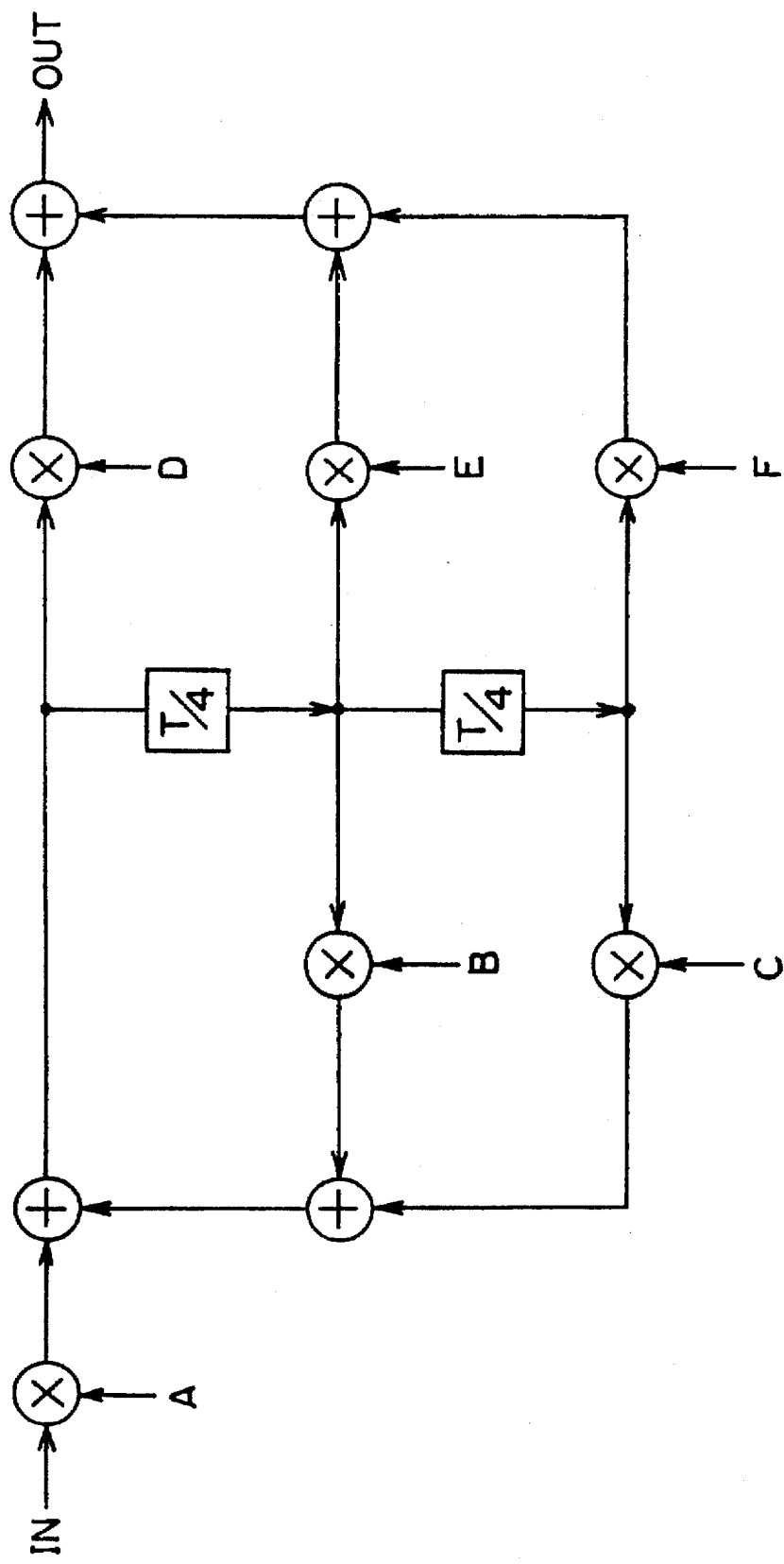
FIG. 4 shows an example of an IIR filter.
Figure 5:
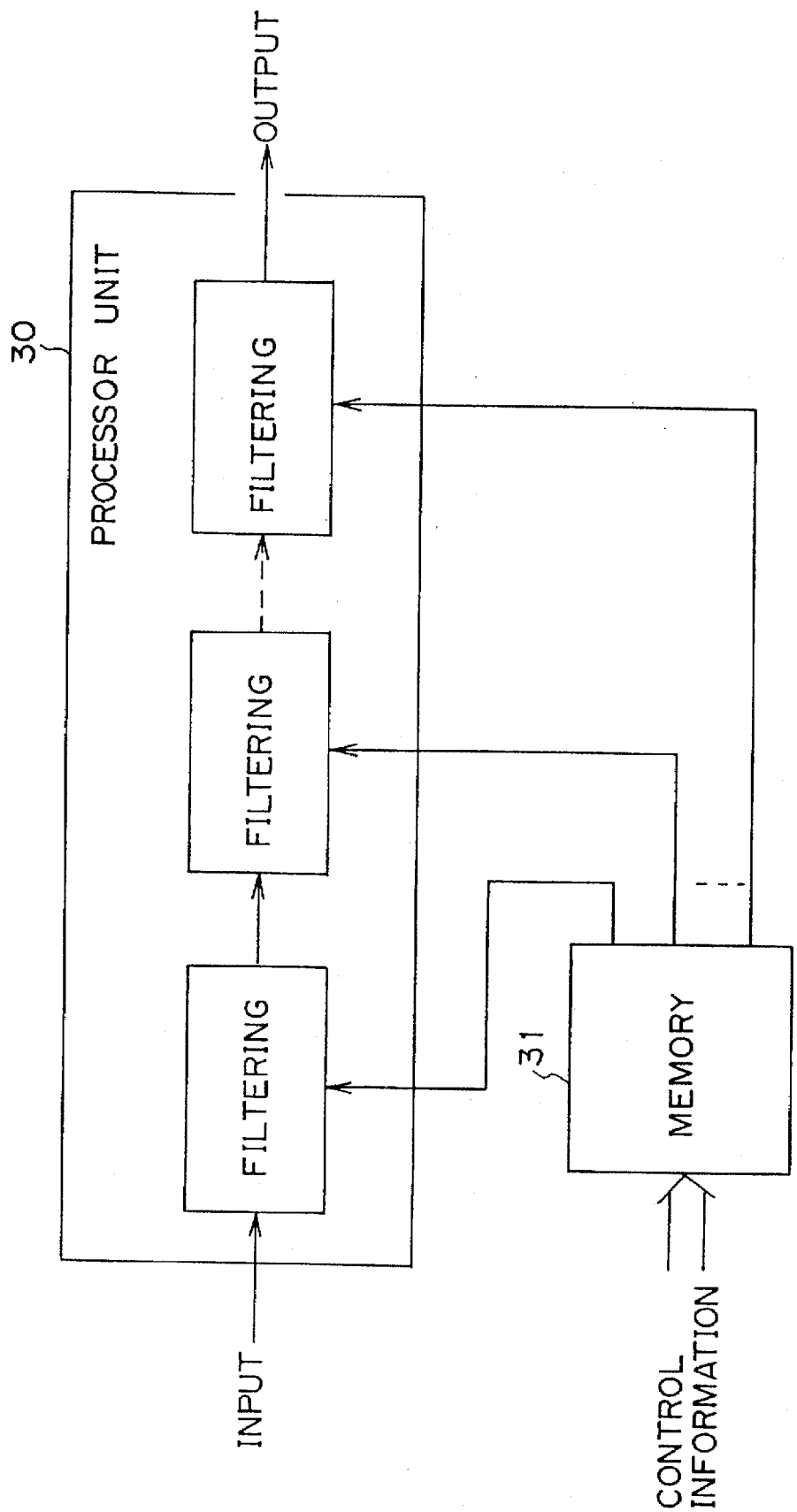
FIG. 5 shows a basic arrangement of the present invention.

Referring now to FIG. 5, the main portion of a fixed equalizer is shown according to the present invention.

A memory 31 stores parameters for determining characteristics of filtering processes executed by a processor unit 30. The processor unit 30 executes filtering processes for amplitude equalization, delay equalization, and line equalization in accordance with parameters output from the memory 31.

Figure 6:
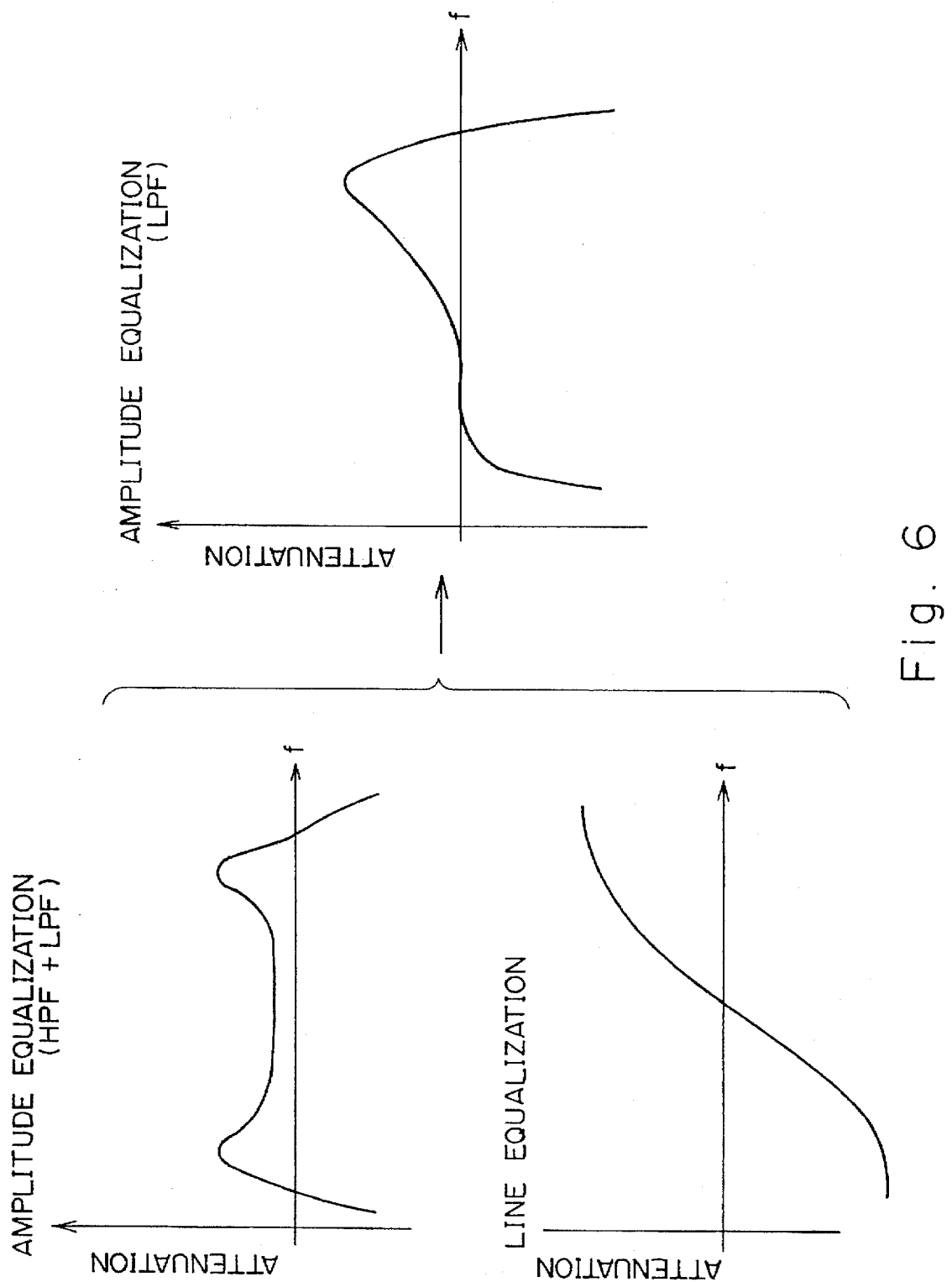
FIG. 6 is a diagram for use in explanation of filtering characteristics.

If the conventional equalization process is considered here, it will be seen that amplitude equalization can be achieved by a synthesis of highpass and lowpass filtering characteristics as shown at upper left of FIG. 6, while the line equalization can be achieved by a filtering characteristic having a negative attenuation characteristic at low frequencies and a positive attenuation characteristic at high frequencies as shown at the lower left of FIG. 6.

The synthesis of the filtering characteristics shown at the left of FIG. 6 results in the lowpass characteristic shown at the right of FIG. 6 in which attenuation is low at low frequencies and high at high frequencies. If, therefore, parameters which provide such a filtering characteristic are stored in the, initially, and parameters associated with equalization to be performed are read into the processor unit 30, then the amplitude equalization and line equalization can be achieved by a single lowpass filtering process. Note that for the amplitude equalization and line equalization, the conventional method needs three filtering processes; a lowpass filtering process, a highpass filtering process, and a line equalization filtering process.

In the memory 31 there are stored parameters of a lowpass filter having a predetermined characteristic which achieves amplitude equalization (which can be realized by a highpass filter and a lowpass filter) and line equalization, and two types of parameters; parameters of a delay equalization filter, and parameters of a lowpass filter, which achieves the delay equalization, the amplitude equalization and the line equalization.

Figure 7:
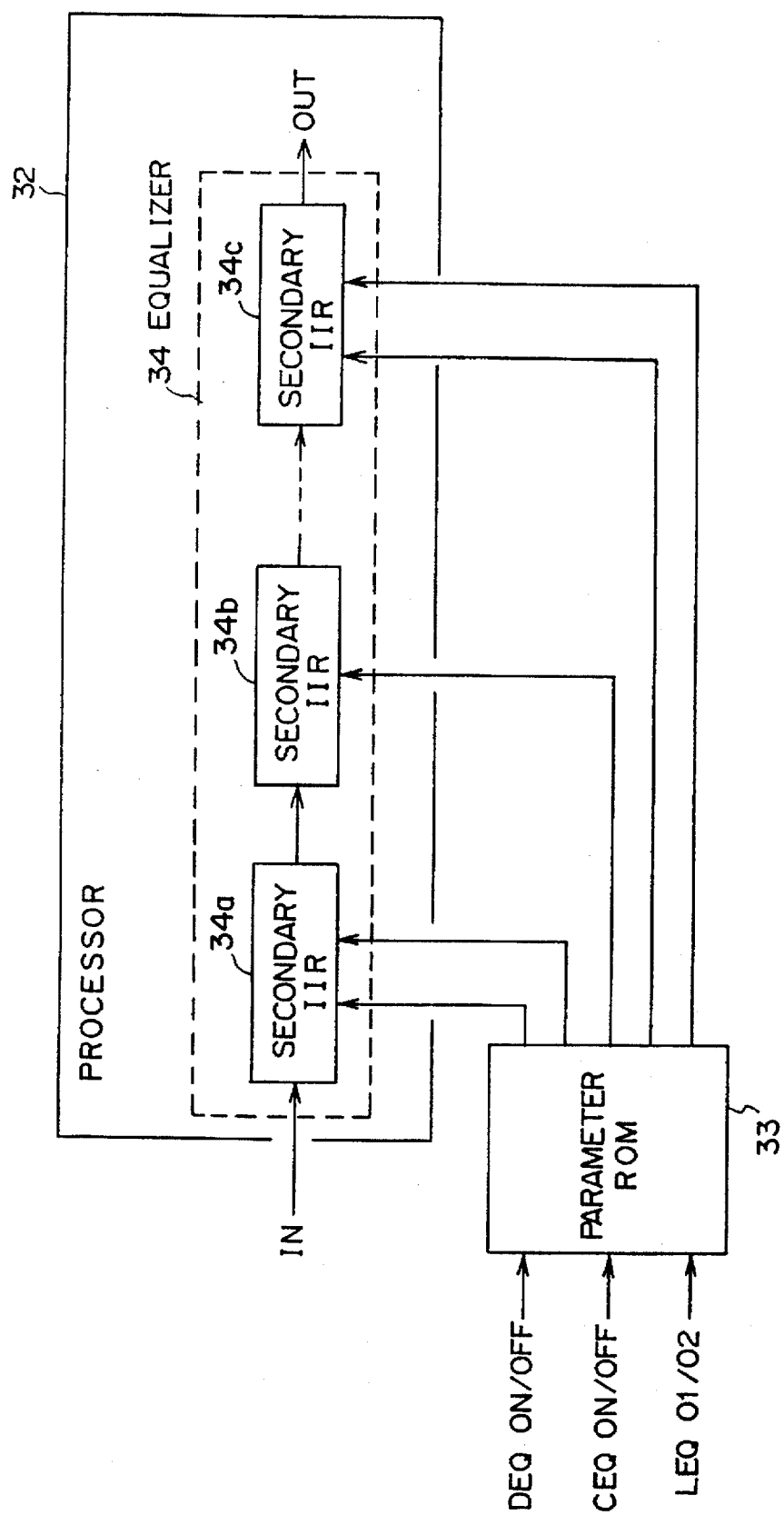
FIG. 7 shows the main portion of a fixed equalizer according to an embodiment of the present invention.

Next, a specific embodiment will be described with reference to FIG. 7, which shows the main portion of a fixed equalizer for performing delay equalization, amplitude equalization and line equalization by the use of secondary IIR filters.

The processor 32 executes secondary IIR filtering processes according to the parameters output from the ROM 33 to thereby perform amplitude equalization, delay equalization and line equalization. The equalizer 34 comprises one or more secondary IIR filtering processes executed by the processor 32. FIG. 7 shows an example in which three secondary IIR filtering processes 35a to 35c are executed.

The parameter ROM 33, which is a ROM storing parameters for determining the characteristics of the secondary IIR filters, responds to a DEQ signal (which is turned on only when delay equalization is performed), a CEQ signal (which is turned on only when amplitude equalization is performed), an LEQ1 signal and an LEQ2 signal (which determine the characteristic of the line equalization filter) by outputting corresponding parameters.

The on-off control of the DEQ signal, the CEQ signal, the LEQ1 signal and the LEQ2 signal is performed so that the eye pattern of signals is optimal at the time of modem installation. An eye pattern shows a signal point arrangement on a two-dimensional plane for signals demodulated from received signals processed by phase modulation, etc.

FIG. 8 shows the contents of the parameter ROM 33. As described above, the parameters of the secondary IIR filters corresponding to the DEQ signal, the CEQ signal, the LEQ1 signal and the LEQ2 signal are stored in the ROM 33.

For example, LPF (lowpass filter) parameters and HPF (highpass filter) parameters are stored to correspond with CEQ=1 (ON). Lowpass filtering parameters are stored to correspond with CEQ=1 and LEQ1 or LEQ2=1. The contents of the parameter ROM 33 will be described later in detail.

The LEQ1 signal and the LEQ2 signal input to the ROM 33 of FIG. 8 will now be described. The LEQ1 signal and the LEQ2 signal are used to specify one of the four filtering characteristics shown in FIG. 9A. When LEQ1=0 and LEQ2=0, the through characteristic with no attenuation is specified which is identified as ① in FIG. 9A. When LEQ1=0 and LEQ2=1, the filtering characteristic identified as ② is specified. Likewise, when LEQ1=1 and LEQ2=0, the filtering characteristic identified as ③ is specified as the line equalization filtering characteristic. When LEQ1=1 and LEQ2=1, the filtering characteristic identified as ④ is specified.

Next, the operation of the embodiment constructed as described above will be described. If the filtering characteristics of an amplitude equalizer and a line equalizer are considered here, it will be seen that the amplitude equalizer can be constructed from a combination of a highpass filter (HPF) and a lowpass filter (LPF) as shown at the upper left of FIG. 10, and the line equalizer can be constructed from a filter having a frequency response as shown at the lower left of FIG. 10.

The synthesis of these filtering characteristics results in the filtering characteristic shown at the right of FIG. 10. This is a lowpass filter characteristic in which the attenuation is low at low frequencies and high at high frequencies. If a digital filter is provided with such a filtering characteristic, then two equalizers (amplitude equalizer and line equalizer) can be replaced with a single equalizer with a lowpass characteristic.

When this concept is applied to the case where an amplitude equalizer and a line equalizer are implemented by secondary IIR filtering processes, it will be seen that the present embodiment can implement a filtering process equivalent to lowpass, highpass and line equalization filtering processes using a single secondary IIR filtering process by providing a secondary IIR filter with parameters which provide such a lowpass characteristic as shown at the right of FIG. 10. In contrast, the conventional method needs three secondary IIR filtering processes; a highpass filter, a lowpass filter, and a line equalization filter.

Figures 9A, 9B:
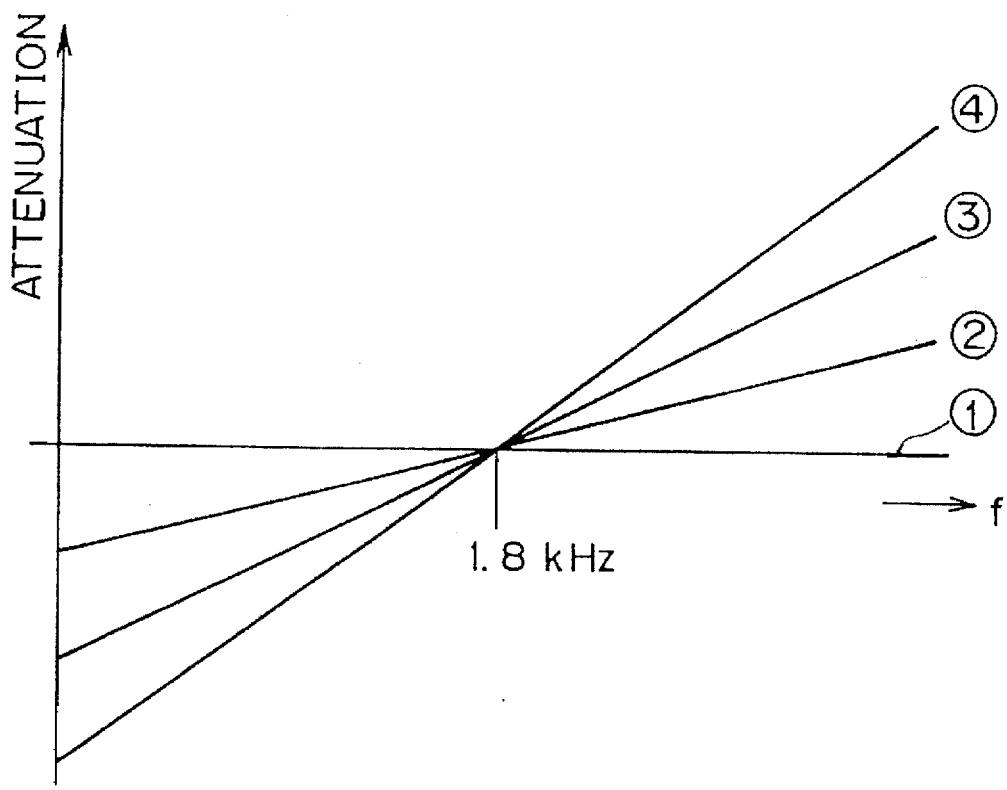
FIG. 9A and 9B are diagrams for use in explanation of line equalization characteristics.

The contents of the parameter ROM 33 will now be described in detail. In the ROM 33, parameters of a lowpass filter having a filtering characteristic equivalent to the synthesis of the highpass and lowpass characteristics of FIG. 10 and the filtering characteristic ② of FIG. 9A are stored as secondary IIR filtering parameters to correspond to the state where CEQ=1 and LEQ2=1, i.e., where amplitude equalization and line equalization indicated by the filtering characteristic ② of FIG. 9A are selected. When both the signals CEQ and LEQ2 are 1, the parameters for such a lowpass filtering characteristic are output to the processor 32. The processor 32 responds to the parameters by performing out the secondary IIR filtering process with the lowpass filtering characteristic.

Therefore, since a single secondary IIR filtering process (in this case a lowpass filtering process) suffices for amplitude and line equalization, the amount of computation required for equalization can be reduced considerably.

The reduction in the amount of computation can be seen from FIG. 8. Parameters for a lowpass filter (LPF) having a predetermined characteristic are stored to correspond to the state where DEQ=0, LEQ1=0, CEQ=1 and LEQ2=1. The (HPF) and (LEQ) next to the lowpass filtering parameters indicate that secondary IIR filtering processes of a highpass filter and a line equalization filter, which are needed in the conventional method, become unnecessary.

Likewise, parameters of a lowpass filter having a filtering characteristic equivalent to the synthesis of the (highpass and lowpass combination) characteristic of FIG. 10 and the filtering characteristic ③ of FIG. 9A are stored as secondary IIR filtering parameters to correspond with the state where CEQ=1 and LEQ1=1, i.e., where amplitude equalization and line equalization indicated by the filtering characteristic ③ of FIG. 9A are selected. The (HPF) and (LEQ) next to the lowpass filtering parameters indicate that the secondary IIR filter processes of highpass filter and line equalization filter, which are needed in the conventional method, become unnecessary.

When the signals CEQ and LEQ1 are 1, the parameters for providing such a lowpass filtering characteristic are output to the processor 32. The processor 32 responds to the parameters by performing the secondary IIR filtering process corresponding to the lowpass filtering characteristic.

In the ROM 33, parameters of a lowpass filter having a filtering characteristic equivalent to the synthesis of the highpass and lowpass combination characteristic of FIG. 10 and the filtering characteristic ④ of FIG. 9A are stored as secondary IIR filtering parameters to correspond with the state where CEQ=1 and LEQ1=LEQ2=1, i.e., where amplitude equalization and line equalization indicated by the filtering characteristic ④ of FIG. 9A are selected. When the signals CEQ, LEQ1 and LEQ2 are 1, the parameters for providing such a lowpass filtering characteristic are output to the processor 32. The processor 32 responds to the parameters to carry out the secondary IIR filtering process corresponding to the lowpass filtering characteristic.

In this case as well, the amount of computation can be reduced to ⅓ of that in the conventional method because a single secondary IIR filtering process satisfies for a lowpass filter, a highpass filter and a line equalization filter.

Likewise, parameters of a delay equalization filter and parameters of a lowpass filter having a characteristic equivalent to the synthesis of the highpass and lowpass combination characteristic of FIG. 10 for amplitude equalization and the filtering characteristic ② of FIG. 9A are stored as secondary IIR filtering parameters to correspond with the state where DEQ=1, CEQ=1 and LEQ2=1, i.e., where delay equalization, amplitude equalization, and line equalization indicated by the filtering characteristic ② of FIG. 9A are selected. When the signals DEQ and CEQ are 1 and the signal LEQ2 is 1, the parameters for providing such a lowpass filtering characteristic are output from ROM 33 to the processor 32. The processor 32 responds to the parameters by performing the secondary IIR filtering process corresponding to the lowpass filtering characteristic.

In this case, the conventional method requires four secondary IIR filtering processes, namely a delay equalization filter, a highpass filter, a lowpass filter and a line equalization filter, in order to achieve delay equalization, amplitude equalization and line equalization, whereas the present embodiment requires only two secondary IIR filtering processes, a namely delay equalization filter and a lowpass filter. Therefore, the amount of computation can be reduced to ½ of that in the conventional method.

The reduction in the amount of computation can be seen from FIG. 8. Parameters for a lowpass filter (LPF) having a predetermined characteristic equivalent to the synthesis of the highpass and lowpass combination filtering characteristic of FIG. 10 and the filtering characteristic ② of FIG. 9A and parameters of a delay equalization filter are stored to correspond with the state where DEQ=1, CEQ=1, LEQ1=0, and LEQ2=1. The (LEQ) in FIG. 8 indicates that a secondary IIR filtering process of a line equalization filter, which is needed in the conventional method, become unnecessary.

Likewise, parameters for a lowpass filter (LPF) having a predetermined characteristic equivalent to the synthesis of the highpass and lowpass combination filtering characteristic of FIG. 10 and the filtering characteristic ③ or ④ of FIG. 9A and parameters of a delay equalization filter are stored to correspond to the state where DEQ=1, CEQ=1 and LEQ1=1; or where DEQ=1, CEQ=1, and LEQ1=LEQ2=1.

In this case as well, whereas the conventional method requires four secondary IIR filtering processes, namely delay equalization filtering, highpass filtering, lowpass filtering and line equalization filtering, the present embodiment requires only two secondary IIR filtering processes, namely delay equalization filtering and lowpass filtering. Therefore, the amount of computation can be reduced to ½ of that in the conventional method.

As described above, the present embodiment can reduce considerably the amount of computation required for filtering by storing parameters of a lowpass filter having a combined characteristic of an amplitude equalization filter and a line equalization filter in the parameter ROM 33 and carrying out secondary IIR filtering according to these parameters. Further, the reduction in the amount of computation results in a decrease in computational error and prevents the degradation of equalization performance due to computational errors.

Although the above embodiments are described as achieving equalization by the use of secondary IIR filters, transversal filters, or FIR filters, or other IIR filters may be used in place of the secondary IIR filters. Further, although the above embodiment was described as performing three types of equalization processes, namely delay equalization, amplitude equalization and line equalization, line equalization and amplitude equalization, only or amplitude equalization and some other type of signal equalization may also be performed.

Although the preferred embodiments have been disclosed and described, it is apparent that other embodiments and modifications are possible.

What is claimed is:

1. A fixed equalizer for realizing fixed equalization of an input signal by sequentially applying one or more filter characteristics to the input signal, comprising:

means for inputting an amplitude equalization signal;

means for inputting a line equalization signal;

first means for outputting a first stored parameter in response to the amplitude equalization signal and the line equalization signal; and second means for applying a first single filter characteristic, equivalent to a sequential summation of an amplitude equalization filter characteristic and a line equalization filter characteristic, to the input signal in response to the first stored parameter output by said first means.

2. The fixed equalizer according to claim 1, further comprising means for inputting a delay equalization signal, wherein:

said first means outputs a second stored parameter in response to the amplitude equalization signal, the line equalization signal, and the delay equalization signal; and said second means sequentially applies a second single filter characteristic equivalent to a delay equalization filter characteristic after applying the first single filter characteristic to the input signal in response to the second stored parameter output by said first means.

3. The fixed equalizer according to claim 1, wherein:

said first means determines that a lowpass filter characteristic is equivalent to a combination of the amplitude equalization filter characteristic and the line equalization filter characteristic, and outputs the first parameter as a parameter specifying the lowpass filter characteristic; and said second means applies a lowpass filter characteristic to the input signal in response to the first parameter.

4. The fixed equalizer according to claim 3, wherein said second means performs a secondary IIR filtering process applying a lowpass filter to the input signal in response to the first parameter.

5. A fixed-equalization method for realizing fixed equalization of an input signal by sequentially applying one or more filter characteristics to the input signal, comprising the steps of:

inputting an amplitude equalization signal and a line equalization signal;

outputting a first stored parameter in response to the amplitude equalization signal and the line equalization signal; and applying a single filter characteristic equivalent to a sequential summation of an amplitude equalization filter characteristic and a line equalization filter characteristic to said input signal in response to the first parameter.

6. The fixed equalization method according to claim 5, wherein:

the first parameter specifies a lowpass filter characteristic which is equivalent to a combination of an amplitude equalization filter characteristic and a line equalization filter characteristic.

7. The fixed-equalization method according to claim 5, further comprising the steps of:

inputting a delay equalization signal;

outputting a second stored parameter in response to the amplitude equalization signal, the line equalization signal, and the delay equalization signal; and sequentially applying a second single filter characteristic equivalent to a delay equalization filter characteristic to the input signal after applying said first single filter characteristic in response to the output second stored parameter.

* * * * *